United States Patent
Betsuno et al.

(10) Patent No.: US 11,256,449 B2
(45) Date of Patent: Feb. 22, 2022

(54) STORAGE SYSTEM

(71) Applicant: Hitachi, Ltd., Tokyo (JP)

(72) Inventors: Kenichi Betsuno, Tokyo (JP);
Nobumitsu Takaoka, Tokyo (JP);
Hideyuki Koseki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 63 days.

(21) Appl. No.: 16/795,735

(22) Filed: Feb. 20, 2020

(65) Prior Publication Data
US 2021/0042062 A1 Feb. 11, 2021

(30) Foreign Application Priority Data
Aug. 9, 2019 (JP) .............................. JP2019-147675

(51) Int. Cl.
*G06F 3/06* (2006.01)

(52) U.S. Cl.
CPC .......... *G06F 3/0689* (2013.01); *G06F 3/0611* (2013.01); *G06F 3/0622* (2013.01); *G06F 3/0635* (2013.01); *G06F 3/0658* (2013.01); *G06F 3/0665* (2013.01); *G06F 2206/1012* (2013.01)

(58) Field of Classification Search
CPC .... G06F 3/0689; G06F 3/0611; G06F 3/0622; G06F 3/0635; G06F 3/0658; G06F 3/0665; G06F 2212/1012
See application file for complete search history.

(56) References Cited

U.S. PATENT DOCUMENTS 7,251,701 B2 * 7/2007 Chikusa ................ G06F 3/0613
710/74
2010/0306465 A1 12/2010 Shimozono et al.
2015/0293708 A1 * 10/2015 Lang ...................... G06F 3/067
711/114

FOREIGN PATENT DOCUMENTS

JP        2012-515371 A    7/2012
WO       2010/134134 A1   11/2010

OTHER PUBLICATIONS

Brandon Thompson, Dean Lang, Joey Parnell, "Drive-Side IO Shipping", IP.com Prior Art Database Technical Disclosure, Mar. 12, 2019 (Year: 2019).*

* cited by examiner

*Primary Examiner* — Khoa D Doan
(74) *Attorney, Agent, or Firm* — Mattingly & Malur, PC

(57) ABSTRACT

A storage system includes controllers, physical storage devices, and logical storage devices to which storage areas are assigned from the physical storage devices. The controllers each have the physical storage device being different from that of each other and the host connected thereto being different from that of each other, and are each able to access the physical storage device and the host that are not connected thereto, through another controller. Any one of the controllers has an ownership to process an access request concerning the logical storage device. At least one controller determines that the ownership is caused to be moved among the controllers, based on an index of accesses to the physical storage device that includes the storage area to be assigned to the logical storage device and an index of accesses to the host that accesses the logical storage device.

8 Claims, 15 Drawing Sheets

FIG.4

| LDEV ID | CTL | CAPACITY | LUN |
|---------|-----|----------|-----|
| 0x0000 | 0 | 250 GB | 0 |
| 0x0001 | 0 | 250 GB | 1 |
| 0x0002 | 1 | 150 GB | 2 |
| 0x0003 | 1 | 150 GB | 3 |
| 0x0004 | 2 | 200 GB | 4 |
| 0x0005 | 2 | 200 GB | 5 |
| 0x0006 | 3 | 150 GB | 6 |
| 0x0007 | 3 | 150 GB | 7 |

LDEV MANAGEMENT TABLE

FIG.5

| LDEV ID | FE PORT | IOPS | GB/S |
|---|---|---|---|
| 0x0000 | 0A | 30000 | 3.2 |
| 0x0000 | 1A | 10000 | 1.5 |
| 0x0001 | 0B | 24000 | 2.7 |
| 0x0001 | 1B | 15000 | 2.0 |
| 0x0002 | 0A | 9000 | 1.4 |
| 0x0002 | 1A | 23000 | 2.7 |
| 0x0003 | 0B | 12000 | 1.8 |
| 0x0003 | 1B | 28000 | 2.8 |
| 0x0004 | 2A | 13000 | 1.7 |
| 0x0004 | 3A | 4000 | 0.7 |
| 0x0005 | 2B | 18000 | 2.2 |
| 0x0005 | 3B | 8000 | 1.2 |
| 0x0006 | 2A | 9000 | 1.3 |
| 0x0006 | 3A | 22000 | 2.5 |
| 0x0007 | 2B | 7000 | 1.1 |
| 0x0007 | 3B | 18000 | 2.1 |

BETWEEN-LDEV-AND-FE PORT LOAD TABLE

PAGE AMOUNT MANAGEMENT TABLE

CTL MANAGEMENT TABLE

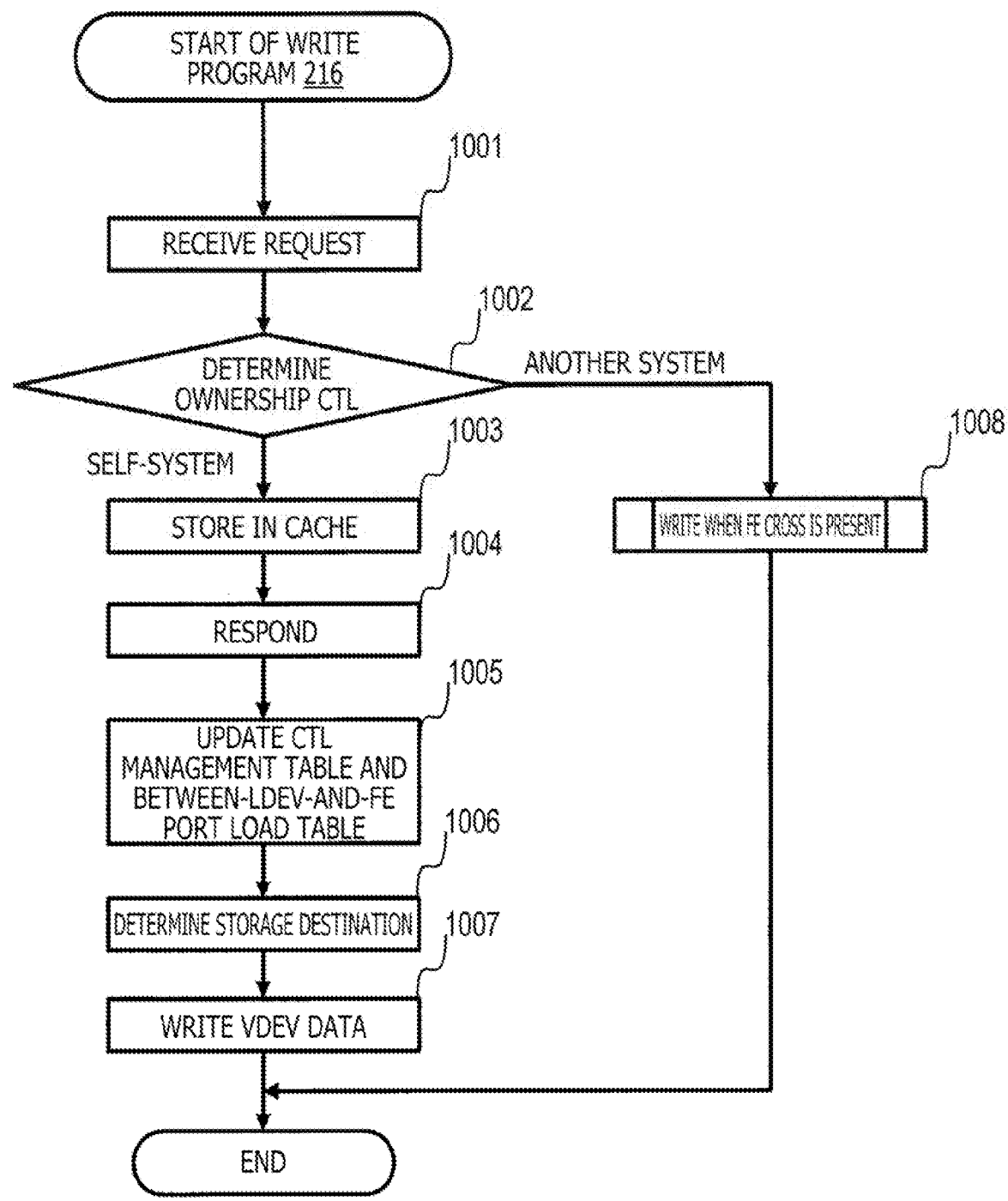

WRITE WHEN FE CROSS IS PRESENT 1008

CPU OPERATION RATE-RESPONSE TIME PERIOD TABLE

STORAGE SYSTEM

CLAIM OF PRIORITY

The present application claims priority from Japanese patent application JP 2019-147675 filed on Aug. 9, 2019, the content of which is hereby incorporated by reference into this application.

BACKGROUND OF THE INVENTION

1. Field of the Invention

The present invention relates to a storage system.

2. Description of the Related Art

A method of configuring a larger-scale storage system by coupling a plurality of independent storage apparatuses (nodes) with each other can be considered as a method of realizing a highly expandable storage system. For this type of storage system, expansion of the performance of the storage system in accordance with the work load is enabled by executing adding-on of the nodes.

Each of the nodes included in this type of storage system includes one or more controllers. To each of the controllers, one or more logical storage device (LDEV) ownerships of a plurality of LDEVs are imparted. Concerning this, the "LDEV" is a logical storage device managed by the storage system. The "LDEV ownership" means an access right to the LDEV. Only the controller having the ownership can process input/output (I/O) to/from the LDEV. In a case where the LDEV ownerships concentrate on a specific controller, this incurs concentration of loads on this controller.

JP-T-2012-515371 describes a technique of, in a storage system including a plurality of processor units, executing load dispersion among the processor units. One or more LDEV ownerships are assigned to each of the processor units. The load dispersion among the processor units is executed without influencing the I/O performance of the storage system as far as possible, by determining the manner of assigning those ownerships on the basis of static load information.

SUMMARY OF THE INVENTION

For example, in a storage system including multiple nodes, each of the nodes includes an independent physical storage device (PDEV). In a case where each controller reads out data from the PDEV of a node other than the node of the controller, the controller needs to transfer the data between the nodes after temporarily reading out the data into a storage area on a controller that is connected to the PDEV (a backend (BE) cross). At this time, the processing efficiency is degraded due to the communication overhead generated between the nodes.

Each controller includes an independent host connection port (a frontend (FE) port), and there is a case where, when the FE port receives an I/O request from the host, the ownership of the LDEV that is the I/O target is assigned to a controller other than the controller that receives this I/O request (an FE cross). In this case, the processing needs to be delegated to the controller that has the ownership of the target LDEV and the processing performance is therefore degraded due to the communication overhead generated between the controllers.

Distributing the ownerships for load dispersion in a multi-node storage system will be considered. The method described in JP-T-2012-515371 does not take into consideration the communication overhead generated between the nodes. There is therefore a case where no appropriate ownership arrangement is executed in the multi-node storage system. An ownership rebalancing technique is therefore desired, that takes into consideration the communication overhead between the nodes in the multi-node storage system.

An aspect of the present invention is a storage system connected to hosts, that includes a plurality of controllers, a plurality of physical storage devices, and a plurality of logical storage devices to which storage areas are assigned from the plurality of physical storage devices. The plurality of controllers are communicably connected to each other, each have the physical storage device connected thereto being different from that of each other and the host connected thereto being different from that of each other, and each can access the physical storage device and the host that are not connected thereto, each through another controller. Any one of the controllers has an ownership to process an access request concerning the logical storage device. At least one controller of the plurality of controllers determines that the ownership is caused to be moved among the plurality of controllers on the basis of an index of accesses to the physical storage device that has the storage area to be assigned to the logical storage device and an index of accesses to the host that accesses the logical storage device.

An aspect of the present invention can improve the processing performance of a storage system that includes a plurality of controllers.

BRIEF DESCRIPTION OF THE DRAWINGS

FIG. 4 is a diagram depicting an LDEV management table in the first embodiment;

FIG. 5 is a diagram depicting a between-LDEV-and-FE port load table in the first embodiment;

FIG. 10 is a diagram depicting a write program in the first embodiment;

DESCRIPTION OF THE PREFERRED EMBODIMENTS

Figure 1:
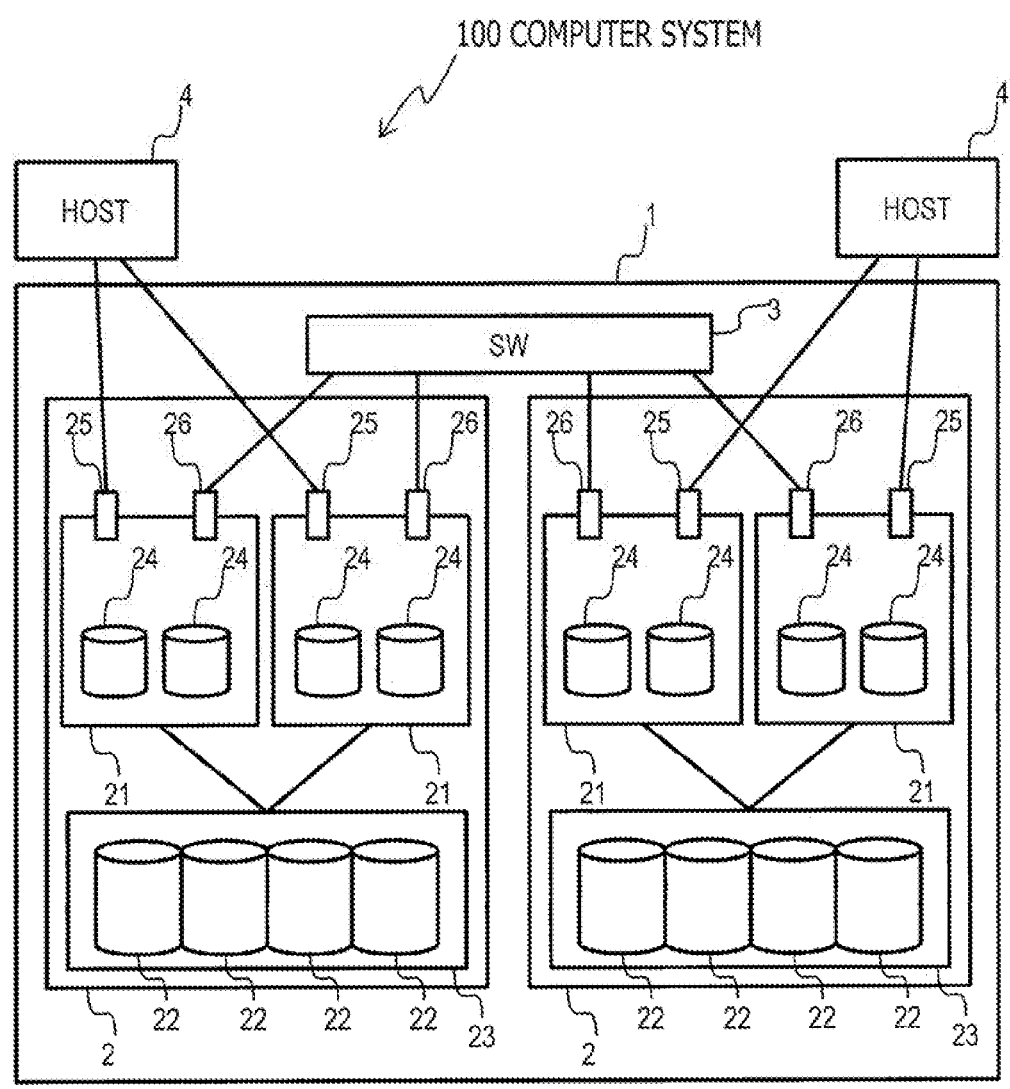
FIG. 1 is a schematic diagram of a storage system in a first embodiment.

Embodiments of the present invention will be described below with reference to the drawings. In addition, in the following description, each of various types of information may be described using an expression such as "management table" while each of the various types of information may be expressed using a data structure other than a table. Moreover, a "management table" can be referred to as "management information" to indicate no dependence on the data structure.

Moreover, there may be cases where a process is described using "program" as the subject. This program is a program that is executed by one or more processors, for example, one or more CPUs, and is a program that executes prescribed processes. In addition, the process is executed appropriately using storage resources (for example, a memory) and a communication interface apparatus (for example, a communication port) and the subject for the processes may therefore be "processor." The processor may include dedicated hardware in addition to the CPU. A computer program may be installed from a program source to each computer. A program source may be a program source that is provided, for example, by a program distribution server or in a storage medium.

Moreover, elements are each identifiable by a reference numeral or the like while another type of identification information such as a name may be used when this information is identifiable. The same reference numeral is given to the same part in the drawings and the description of the present invention while the present invention is not limited to this embodiment and every application example matching with the idea of the present invention is included in the technical scope of the present invention. Moreover, as far as not especially limited, each component may be plural or singular.

First Embodiment

FIG. 1 is a diagram depicting an overview of a computer system 100 in the first embodiment. The computer system 100 includes a storage system 1 and hosts 4 connected to the storage system 1. The storage system 1 includes one or a plurality of nodes 2. In an example described below, the plurality of nodes 2 are included in the storage system 1. Each of the nodes 2 can alone constitute a storage system. FIG. 1 depicts a case where the storage system 1 includes two of the nodes 2 and is connected to two of the hosts 4, as an example.

The storage system 1 includes a plurality of controllers 21, and each of the nodes 2 includes one or a plurality of controllers 21 and one or a plurality of PDEVs 22. More specifically, the PDEVs 22 are each a physical storage device such as a hard disk drive or a non-volatile memory.

For each of the nodes 2, the plurality of PDEVs 22 configure a redundant array of independent disks (RAID) group. A virtual device (VDEV) 23 provides a storage space based on the RAID group.

The controller 21 is connected to the VDEV 23 of the same node 2 as that thereof, and can directly execute reading and writing of data through no other controller 21. The controller 21 is not directly connected to any VDEV 23 of another node 2 and, in a case of accessing the VDEV 23 of another node 2, the controller 21 indirectly accesses this VDEV 23 through the controller 21 in the node 2 to which this VDEV 23 belongs.

The controller 21 includes a logical storage volume LDEV 24. The LDEV 24 is a logical storage device managed by the storage system and has a volume usable as a storage area from the host 4. One or more LDEV ownerships are assigned to the controller 21. The LDEV ownership is a right to access the LDEV 24.

In the configuration example in FIG. 1, the controller 21 includes a plurality of host connection ports 25 (each also referred to as "FE port"). The host 4 is connected to the storage system 1 through the host connection port 25. In addition, FIG. 1 depicts one of the host connection ports 25 of each of the controllers 21 as an example.

The controller 21 includes a plurality of controller connection ports 26. The controllers 21 are each connected to each other through the controller connection port 26, and each can communicate with each other. FIG. 1 depicts the one controller connection port 26 of each of the controllers 21 as an example. In the example in FIG. 1, the plurality of controller connection ports 26 are each connected to each other through a switch 3.

Figure 2:
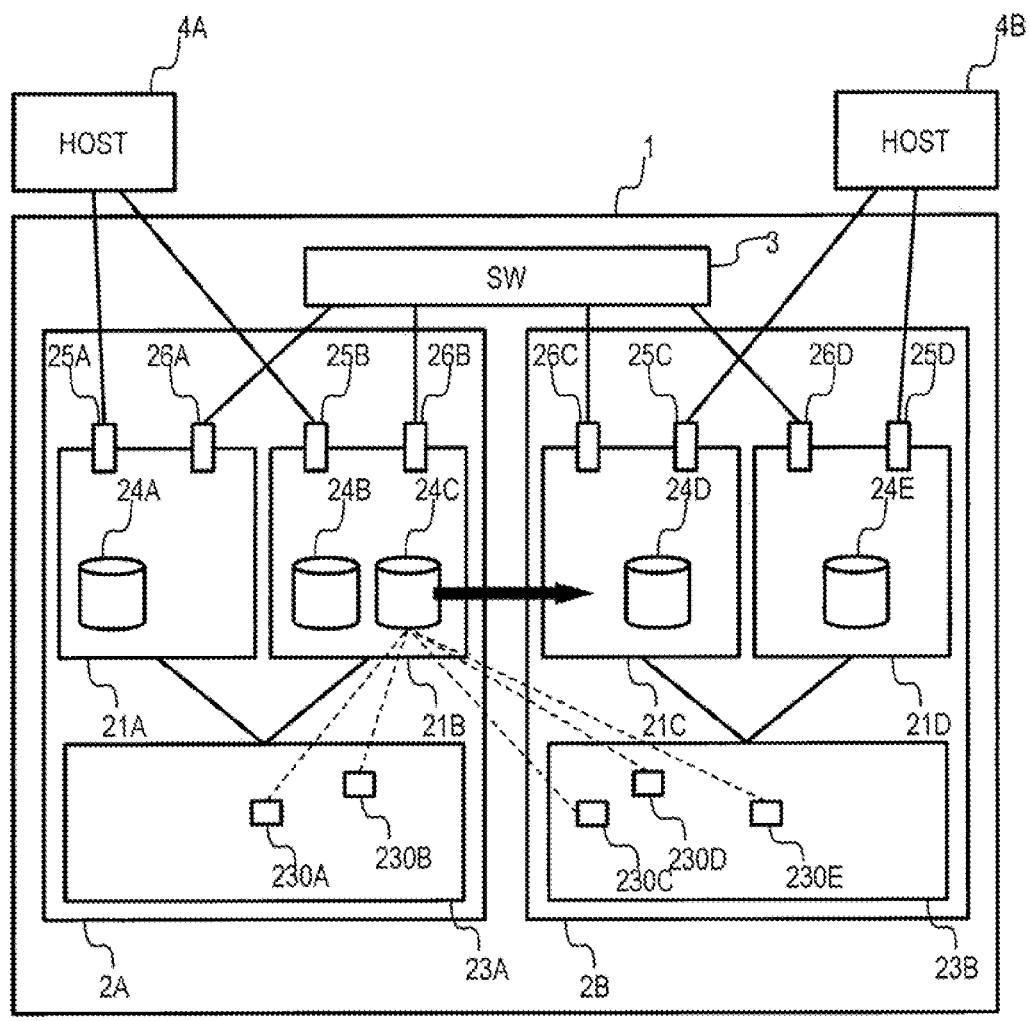
FIG. 2 is a diagram for explaining the overview of the first embodiment.

FIG. 2 is a diagram depicting the overview of the first embodiment. In FIG. 2, the reference numeral of the same type of component consists of a combination of the same parent number and a different child number. In the following description, in a case where the same type of components are not distinguished from each other, the description will be made using only the parent number.

The ownership of the one or more LDEVs 24 is assigned to each of the controllers 21. For example, the ownership of the LDEV 24A is assigned to the controller 21A, and the ownership of the LDEV 24B and the LDEV 24C is assigned to the controller 21B.

Storage areas of the VDEV 23 are assigned to the LDEV 24 each in a specific unit (page) as a real storage area that corresponds to the LDEV 24. In FIG. 2, as the real storage areas corresponding to the LDEV 24C, pages 230A and 230B from the VDEV 23A and pages 230C, 230D, and 230E from the VDEV 23B are assigned. The pages 230 may be assigned from the VDEV 23 in the plurality of nodes 2 to each of the LDEVs 24.

In this embodiment, any of the controllers 21 moves the LDEV ownership assigned to the controller 21 whose load is high (for example, the controller 21B) to the other controller 21, triggered by occurrence of a bias in the load among the controllers 21 in the storage system 1 (for example, the CPU operation rate). In the following, it is assumed that the load is the CPU operation rate, and the CPU operation rate refers to the rate of the CPU operation time period that accounts for in the system overall time period.

In the move of the LDEV ownership, the controller 21 calculates a cross penalty index for each of the LDEVs 24 for which the controller 21E whose load is high has their ownership, and selects, for example, the LDEV 24 whose value thereof is the highest (for example, the LDEV 24C) as the target of the ownership move. The cross penalty index is the index of the overhead of the host access to the LDEV 24, and the calculation method for this index will be described later.

Concerning the above, the cross penalty index is calculated on the basis of the transfer process overhead between the nodes (in a case where the nodes are present) and between the controllers that is generated when the I/O request to the LDEV 24 is processed. For example, a case where a read request to the LDEV 24C is sent from the host 4A through the host connection port 25A in FIG. 2 will be considered. The controller 21A having the read request received therein does not have the ownership of the LDEV 24C and therefore needs to delegate the process to the controller 21B that has the ownership. At this time, the communication overhead is generated between the controllers 21.

Moreover, in a case where the read target data in the LDEV 24C is stored in the page 230C in the VDEV 23B, the controller 21C of the node 2B needs to transfer the data to the controller 21A after reading out the data once. At this time, the communication overhead is generated between the nodes.

The controller 21 executes reassignment of the ownership of the LDEV 24C for the controller 21C on the basis of the CPU operation rate and the cross penalty index of each of the controllers 21. The controller 21 executes leveling of the loads by selecting the assignment destination of the ownership such that the uniformity of the CPU operation rates of the controllers 21 is improved.

Moreover, the controller 21 calculates the cross penalty index acquired after the ownership is moved and, in a case where the cross penalty index satisfies a predetermined condition, determines to move the ownership. The predetermined condition is, for example, that the cross penalty index after the move is equal to or improved compared to the cross penalty index before the move. In another example, even when the cross penalty index after the move is worse than the cross penalty index before the move, in a case where the degree thereof is smaller than a predetermined value, the controller 21 may determine to move the ownership. Degradation of the performance of access to the LDEV 24 due to the move of the ownership is suppressed by the above conditions.

Figure 3:
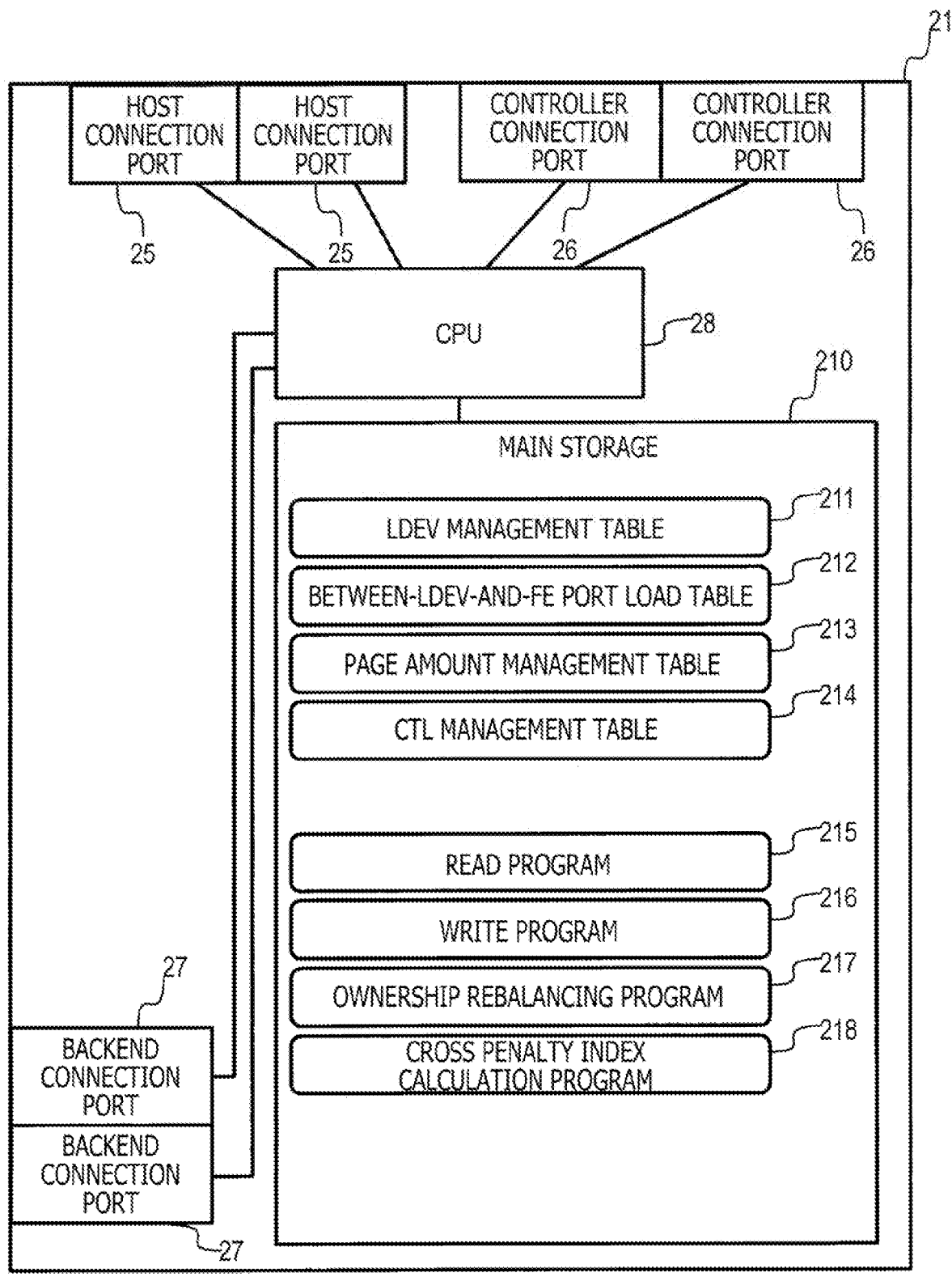
FIG. 3 is a diagram depicting a controller in the first embodiment.

FIG. 3 depicts a configuration diagram of the controller 21 in this embodiment. The controller 21 is a computer that includes the host connection ports 25, the controller connection ports 26, backend connection ports 27, a CPU 28, a main storage 210, and the like.

The CPU 28 reads out and executes programs stored in the main storage 210, and thereby realizes the functions of the storage system. For example, the CPU 28 operates as a read part, a write part, an ownership rebalancing part, and a cross penalty index calculating part in accordance with a read program 215, a write program 216, an ownership rebalancing program 217, and a cross penalty index calculation program 218.

The main storage 210 stores therein the programs 215 to 218 to be executed by the CPU 28 and a plurality of tables 211 to 214 that each manage the data necessary for executing the programs. In the I/O process for the LDEV 24, the main storage 210 is also used as a cache memory by the controller 21.

The LDEV management table 211 is a table for the storage system 1 to retain management information relating to the LDEV 24 included in the storage system 1. The between-LDEV-and-FE port load table 212 is a table to retain load information regarding a pair of the LDEV 24 and the host connection port 25. The load information is retained in a form of "input output per second (IOPS)" and a data transfer amount per unit time. In an example described below, the IOPS represents the number of times of each of read accesses and write accesses per unit time.

The page amount management table 213 is a table retaining information that indicates how much of the data stored in the LDEV 24 is stored in each of the VDEVs 23. The controller (CTL) management table 214 is a table that manages the operation rate of the CPU 28 included in the controller 21 (written as "CTL" in the drawing).

The read program 215 processes a read request from the host 4. The write program 216 processes a write request from the host 4. The ownership rebalancing program 217 executes a move of the LDEV ownership to execute the leveling of the loads among the controllers 21. In an ownership rebalancing process, the cross penalty index calculation program 218 calculates a cross penalty index used for a case where the ownership of the LDEV 24 is assigned to a certain one of the controllers 21.

FIG. 4 is a diagram for explaining the LDEV management table 211 in this embodiment. Each of the rows of the LDEV management table 211 corresponds to each of the LDEVs 24, and retains the management information regarding the corresponding LDEV 24. Each of the columns of the LDEV management table 211 will be described below.

The column 2111 stores therein an identifier (ID) allocated to the LDEV 24 (an LDEV ID). For example, an integer is usable as a data type of the identifier. The column 2112 stores therein the number of the controller 21 to which the ownership of the corresponding LDEV 24 is assigned.

The column 2113 stores therein a logical capacity of the corresponding LDEV 24. The column 2114 stores therein the logical unit number (LUN) of the corresponding LDEV 24. The LUN is an identification number assigned to a logical unit (LU). The LU is recognized as one logical disk from the host 4. When the host 4 executes an I/O request for the storage system 1, the host 4 designates the target LUN. The storage system 1 identifies to which LDEV 24 the designated LUN corresponds. FIG. 5 is a diagram for explaining the between-LDEV-and-FE port load table 212 in this embodiment. Each of the rows of the between-LDEV-and-FE port load table 212 corresponds to a pair of the LDEV 24 and the host connection port 25. Each of the rows stores therein the IOPS and the data transfer amount for the I/O that is executed for the pair of the LDEV 24 and the host connection port 25. Each of the columns of the between-LDEV-and-FE port load table 212 will be described below.

The column 2121 stores therein an identifier of the LDEV 24 (an LDEV ID). The column 2122 stores therein an identifier of the host connection port 25 at which the I/O from the host 4 is executed for the corresponding LDEV 24. For example, the identifier of the host connection port 25 includes the number of the controller 21 and a child letter in the controller 21.

The column 2123 stores therein the IOPS of the I/O that passes through the host connection port 25 of the column 2122, of the I/Os from the host 4 for the corresponding LDEV 24. The column 2124 stores therein the data transfer amount of the I/Os that pass through the host connection port 25 of the column 2122, of the I/Os from the host 4 for the corresponding LDEV 24.

Figure 6:
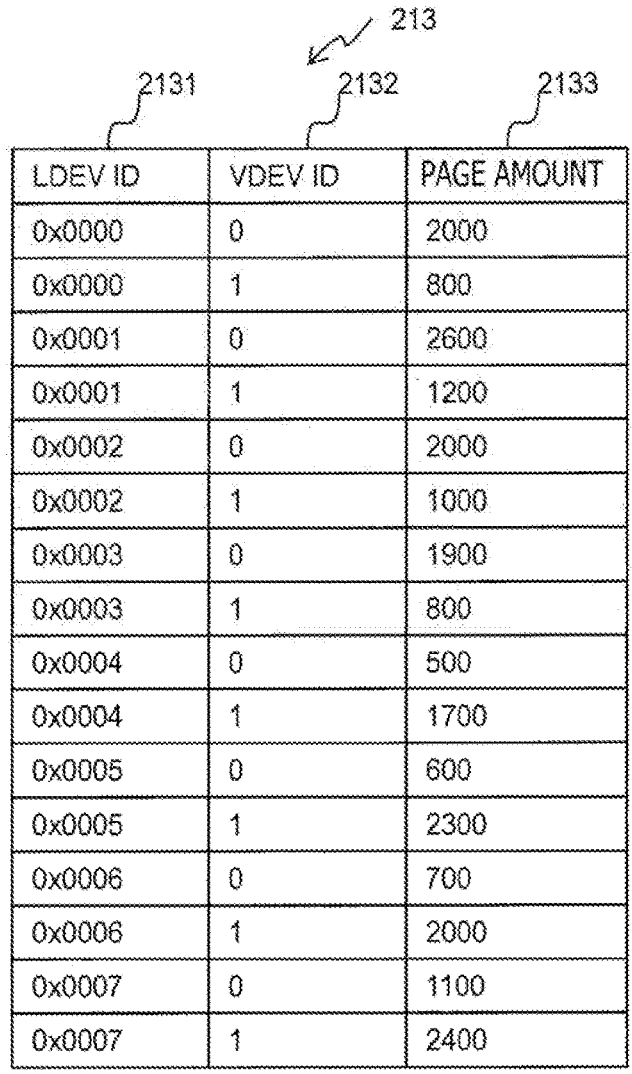
FIG. 6 is a diagram depicting a page amount management table in the first embodiment.

FIG. 6 is a diagram for explaining the page amount management table 213 in this embodiment. Each of the rows of the page amount management table 213 corresponds to a pair of the LDEV 24 and the VDEV 23. Each of the rows thereof stores therein the page amount assigned from each of the VDEV 23 to the LDEV 24 as a real storage area to store therein data. The page is assigned to the LDEV 24 when the page is necessary for newly storing data in the LDEV 24. Moreover, a page that is unnecessary after the assignment thereof is made free.

Each of the columns of the page amount management table 213 will be described below. The column 2131 stores therein an identifier of the LDEV 24 (an LDEV ID). The column 2132 stores therein an identifier of the VDEV 23 (a VDEV ID). The column 2133 stores therein the page amount that is assigned as a real storage area from the corresponding VDEV 23 to store therein the data stored in the corresponding LDEV 24.

Figure 7:
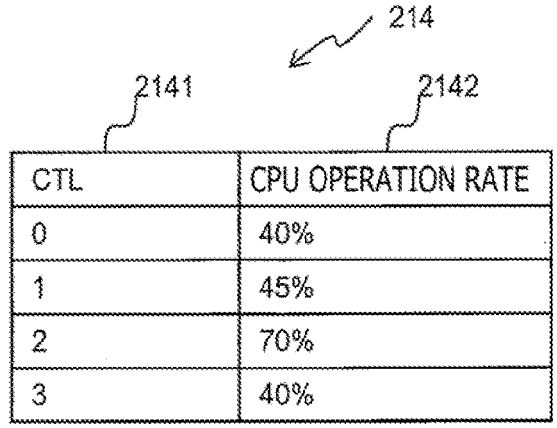
FIG. 7 is a diagram depicting a controller management table in the first embodiment.

FIG. 7 is a diagram for explaining the CTL management table 214 in this embodiment. Each of the rows of the CTL management table 214 corresponds to each of the controllers 21 of the storage system 1, and stores therein the operation rate of the CPU 28 included in each of the controllers 21. Each of the columns of the CTL management table 214 will be described below. The column 2141 stores therein the number of the controller 21. The column 2142 stores therein the operation rate of the CPU 28 in the corresponding controller 21.

In addition, though not depicted, the main storage 210 stores therein information that indicates the relation between the controller 21 and the VDEV 23. This information indicates the controller 21 and the VDEV 23 that are included in the same node. The controller 21 is connected to the VDEV 23 of the same node and is directly accessible through no other controller 21.

FIGS. 8 and 9 are each a diagram for explaining the process flow of the read program 215 in this embodiment. The read program 215 starts, triggered by the reception of a read request from the host 4, reads out the requested data, and transfers the data to the host 4.

Figure 8A:
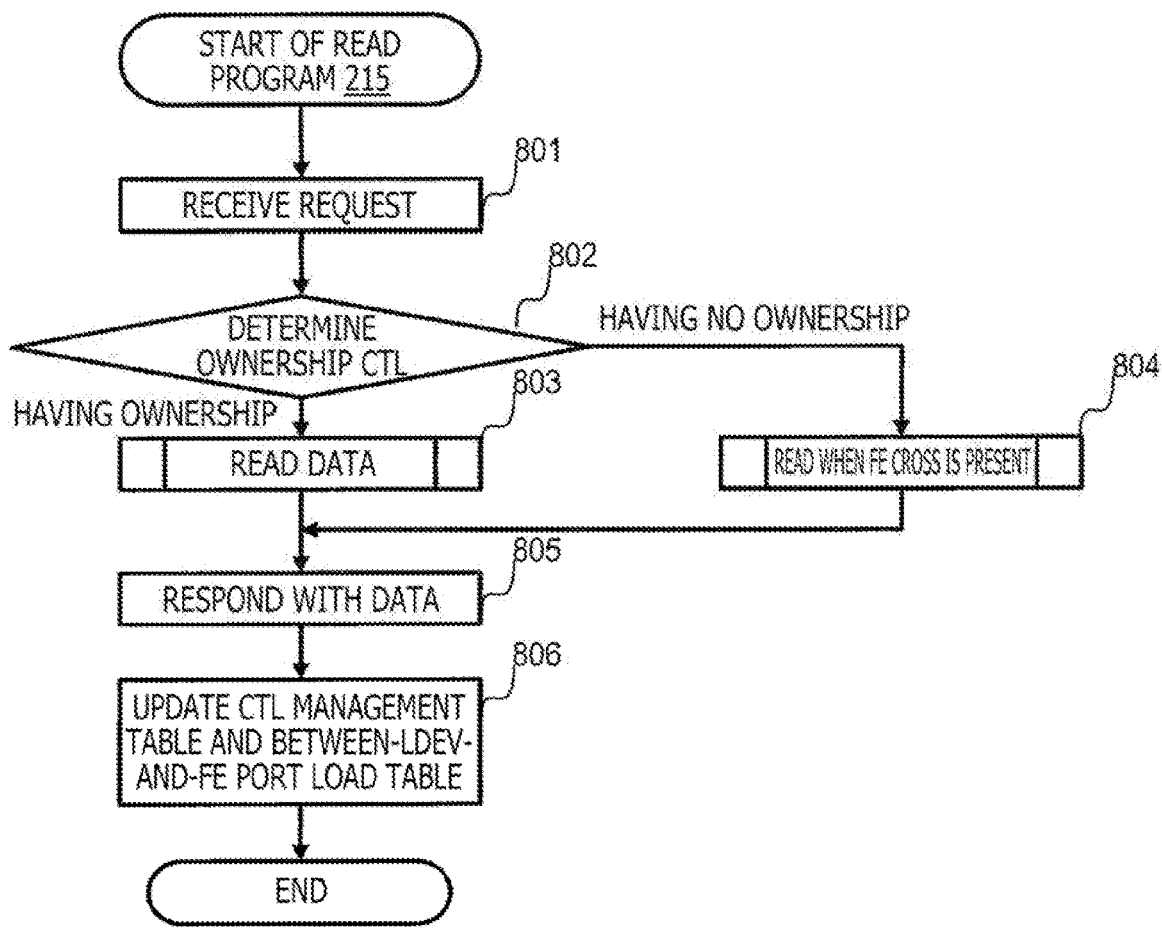
FIG. 8A is a diagram for explaining processes of a read program in the first embodiment.

A process flow of the read program 215 will be described below with reference to FIG. 8A to FIG. 9B. FIG. 8A will first be described. Step 801: The read program 215 receives a read request from the host 4. This read request includes the LUN of the storage destination of the read target data, and the logical address and the data length of the read target. The read program 215 refers to the LDEV management table 211 and identifies the LDEV 24 that corresponds to the designated LUN.

Step 802: The read program 215 reads the identifier of the LDEV 24 included in the received read request, refers to the LDEV management table 211, and determines whether or not the ownership of the LDEV 24 is assigned to the self-controller 21. In a case where the read program 215 determines that the ownership is assigned to the self-controller 21 (802: HAVING OWNERSHIP), the read program 215 moves to step 803. In a case where the read program 215 determines that no ownership is assigned (802: HAVING NO OWNERSHIP), the read program 215 moves to step 804.

Step 803: The read program 215 executes the data read process for the LDEV 24 for which the self-controller has the ownership thereof. This process will be described later. Step 804: The read program 215 executes the data read process for the LDEV 24 for which another controller 21 of the storage system 1 has the ownership thereof. This process will be described later.

Step 805: The read program 215 returns the target data to the host 4. Step 806: The read program 215 acquires the operation rate of the CPU 28 in the inside, and updates the CTL management table 214. Moreover, for the pair of the LDEV 24 and the host connection port 25 for which the read request is issued, the read program 215 updates the IOPS and the data transfer amount of the between-LDEV-and-FE port load table 212 in accordance with the read process executed this time.

Figure 8B:
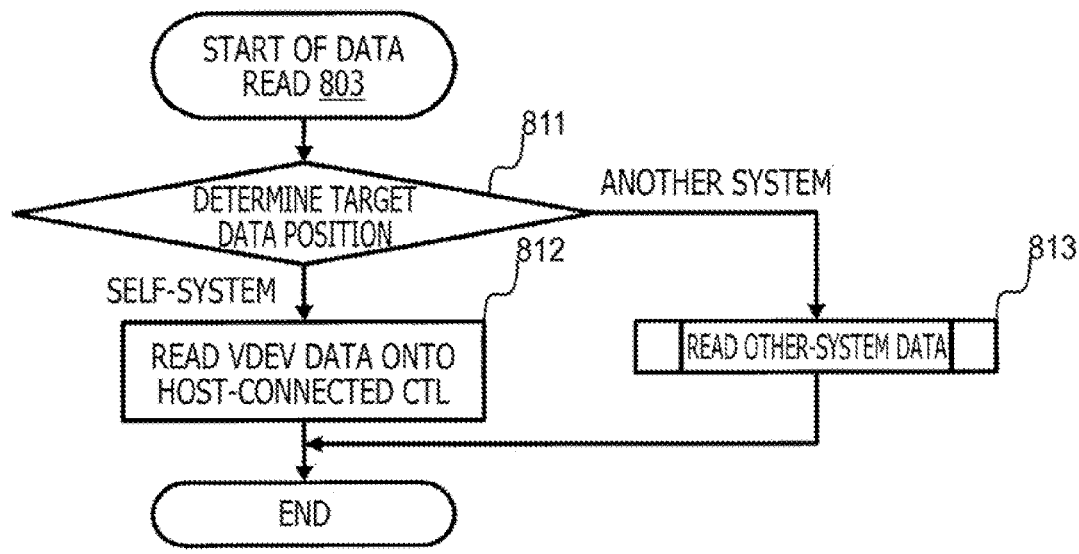
FIG. 8B is a diagram for explaining the processes of the read program in the first embodiment.

The details of the process at step 803 (and step 903 described later) will be described with reference to a flowchart depicted in FIG. 8B. Step 811: The read program 215 identifies in which page of the VDEV 23 the read target data on the LDEV 24 is stored, by referring to a management table not depicted. In a case where the read program 215 identifies that the data is stored in a page of the VDEV 23 in the same node (811: SELF-SYSTEM), the read program 215 moves to step 902. In a case where the read program 215 identifies that the data is not stored therein (811: ANOTHER SYSTEM), the read program 215 moves to step 903.

Step 812: The read program 215 reads the target data from the VDEV 23 of the same node through the backend connection port 27, and stores the target data in the cache memory of the controller 21 that has the request received therein from the host 4.

Step 813: The read program 215 reads the data stored in the VDEV 23 of another node, and stores this data in the cache memory of the controller 21 that has the request received therein from the host 4. The controller 21 (the read program 215) cannot directly read the data from the VDEV 23 of any node other than the same node, and the read program 215 therefore issues a transfer request of the data to the controller 21 that is connected to the target VDEV 23. The controller 21 having the transfer request received therein reads the data from the target VDEV 23, and transfers the data to the controller 21 that has the request received therein from the host 4.

Figure 9A:
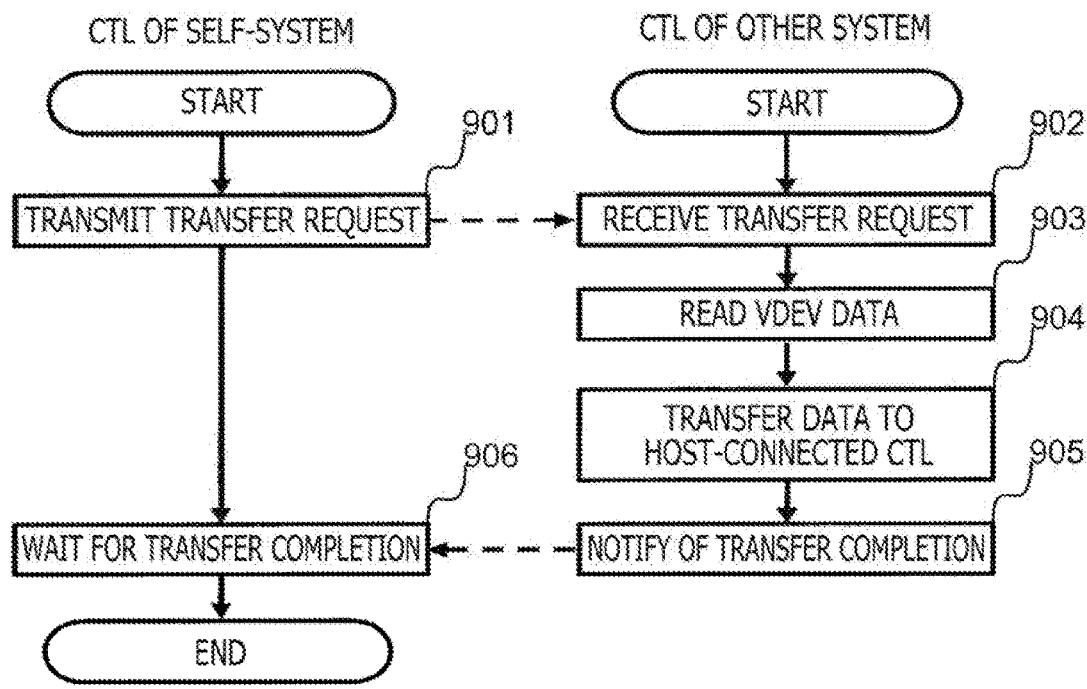
FIG. 9A is a diagram for explaining the read program in the first embodiment.

The details of the process at step 813 will be described with reference to a flowchart in FIG. 9A. The flowchart in FIG. 9A is a diagram for explaining the process flow of reading the data stored in the VDEV 23 of another node, through the controller 21 that is connected to this VDEV 23. In the following, for facilitation of the description, though the "controller 21" is the subject, the read program 215 of the controller 21 operates.

Step 901: The controller 21 (a self-system controller) that asks for the read process executes a transfer request for target data, for the controller 21 connected to the VDEV 23 that has the target data stored therein (an other-system controller). The controller 21 (the self-system controller) thereafter waits for a transfer completion notice from the other-system controller 21 (step 906).

Step 902: The other-system controller 21 receives the transfer request from the self-system controller 21 and starts the process. Step 903: The other-system controller 21 reads the data that is requested from the self-system controller 21, from the VDEV 23.

Step 904: The other-system controller 21 transfers the data to the designated controller 21. Step 905: The other-system controller 21 notifies the self-system controller 21 of the completion of the data transfer. Step 906: The self-system controller 21 receives a data transfer completion notice from the other-system controller 21.

Figure 9B:
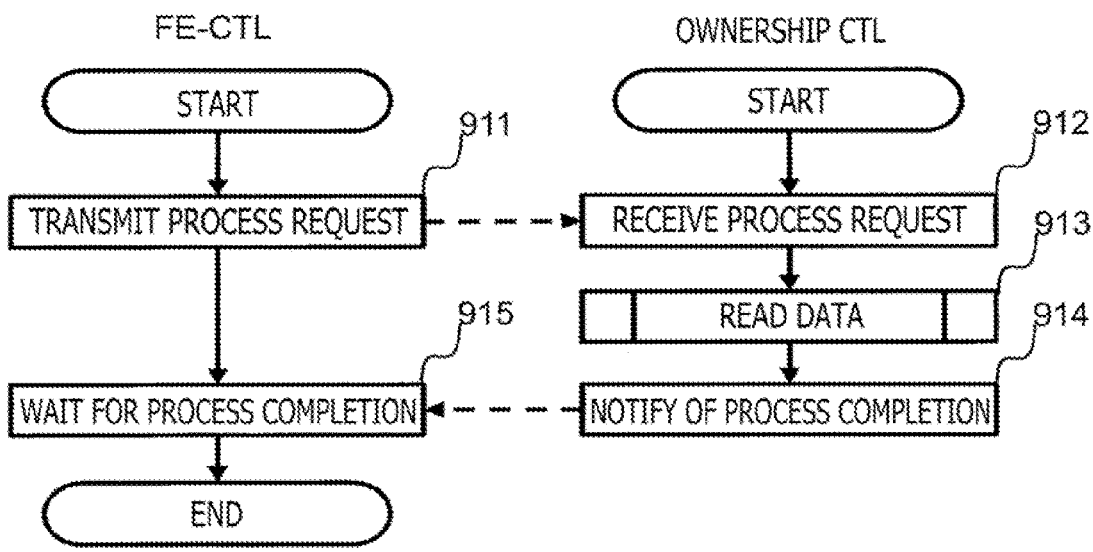
FIG. 9B is a diagram for explaining the read program in the first embodiment.

The details of the process at step 804 will be described with reference to a flowchart in FIG. 9B. The flowchart in FIG. 9B is a diagram for explaining a process of delegating the read process for the LDEV 24, to the ownership controller 21 in a case where the controller 21 having the read request received therein from the host 4 (hereinafter, referred to as "FE controller") and the ownership controller (the controller having the ownership) 21 of the LDEV 24 of the read target differ from each other (an FE cross). In the following, for facilitation of the description, though the "controller 21" is the subject, the read program 215 of the controller 21 operates.

Step 911: The FE controller 21 executes a read process request for the ownership controller 21 of the target LDEV 24. The FE controller 21 thereafter waits for a process completion notice from the ownership controller 21 (step 915). Step 912: The ownership controller 21 receives the read process request and starts the process.

Step 913: The ownership controller 21 executes the data read process for the target LDEV 24 (the process depicted in the flowchart in FIG. 8B). Step 914: The ownership controller 21 notifies the FE controller 21 of the process completion. Step 915: The FE controller 21 receives the process completion notice from the ownership controller 21.

Figure 11:
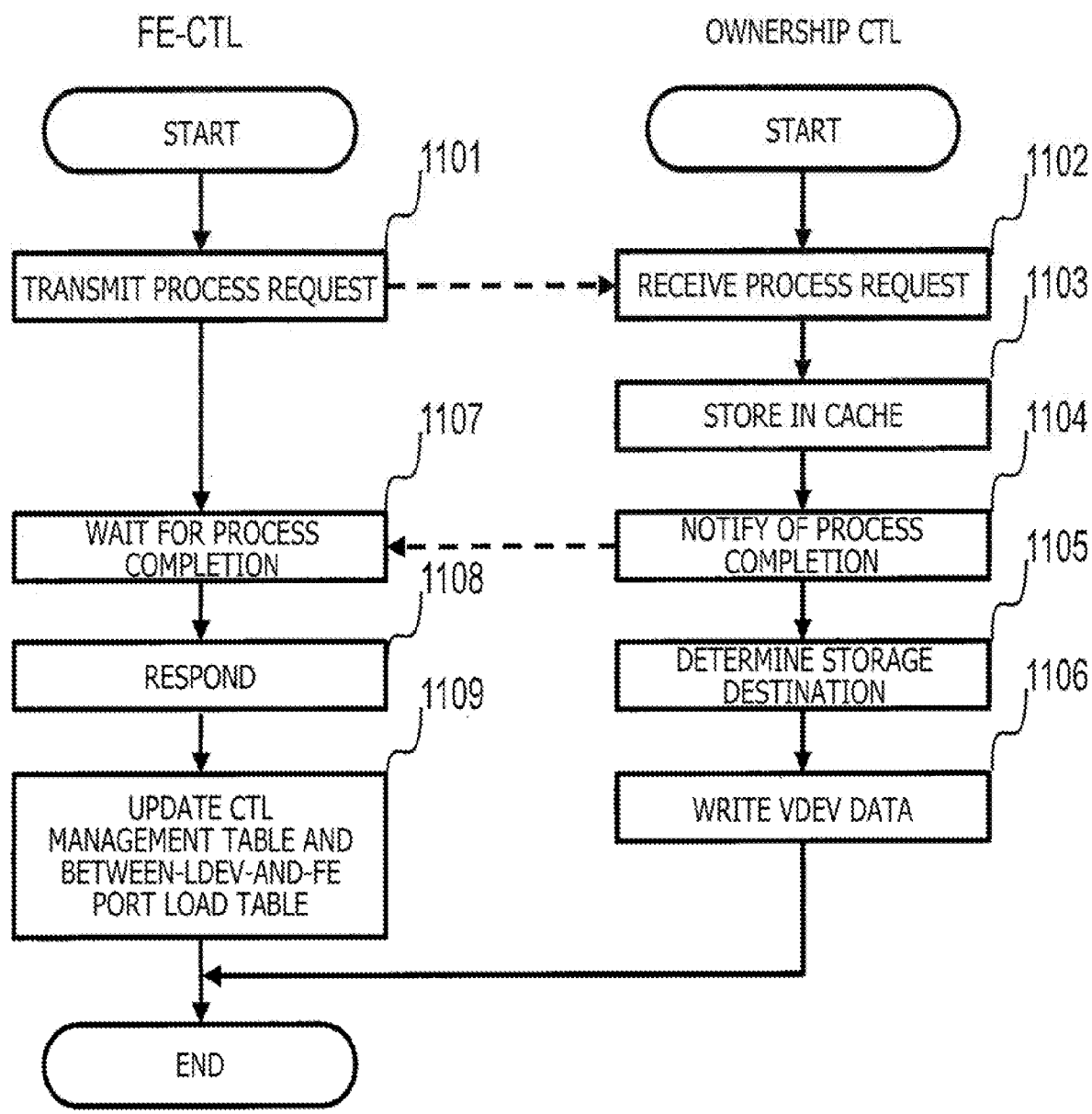
FIG. 11 is a diagram depicting the write program in the first embodiment.

FIG. 10 and FIG. 11 are diagrams for explaining the process flow of the write program 216 in this embodiment. Operations based on flowcharts in FIG. 10 and FIG. 11 are as follows.

Step 1001: The write program 216 receives a write request from the host 4. This write request includes an identifier of the LDEV 24 that is the storage destination of the data to be the write target, and the logical address and the data length of the write target.

Step 1002: The write program 216 reads the identifier of the LDEV 24 included in the received write request, and determines whether or not the ownership corresponding to the LDEV 24 is assigned to the self-controller 21, by referring to the LDEV management table 211. In a case where the write program 216 determines that the ownership is assigned to the self-controller 21 (1002: SELF-SYSTEM), the write program 216 moves to step 1003. In a case where the write program 216 determines that the ownership is not assigned thereto (1002: OTHER SYSTEM), the write program 216 moves to step 1008.

Step 1003: The write program 216 receives host data from the host 4 and stores the host data in a cache memory area of the main storage 210. Step 1004: The write program 216 notifies the host 4 of the completion of the write process.

Step 1005: The write program 216 acquires the operation rate of the CPU 28 in the inside and updates the CTL management table 214. Moreover, the write program 216 updates the IOPS and the data transfer amount in the between-LDEV-and-FE port load table 212 for the pair of the LDEVs 24 for which the write request is present and the host connection port 25.

Step 1006: The write program 216 determines the page to be the destage destination of the data stored in a cache at step 1003. In a case where a page is assigned to the LDEV logical address of the write target, the write program 216 determines this page as the destage destination. In a case where no page is assigned to the LDEV logical address of the write target, the write program 216 newly assigns a page from the VDEV 23 to the address space that includes this logical address, and determines this page as the destage destination. At this time, the VDEV 23 that is the assignment source of the page does not need to be present on the node same as that of the controller 21.

Step 1007: The write program 216 destages the data stored in the cache at step 1003 to a page on the VDEV 23. In a case where the VDEV 23 of the destage destination is present in another node, the write program 216 transfers the target data to the controller 21 in the other node and executes a destage request. In a case where a page is newly assigned from the VDEV 23, the write program 216 updates the page amount management table 213.

Step 1008: In a case where the LDEV ownership is not assigned to the self-controller 21, the write program 216 delegates the write process to the ownership controller 21. The details of this process will be described later.

The details of the process at step 1008 will be described with reference to a flowchart in FIG. 11. The flowchart in FIG. 11 is a diagram for explaining the flow of delegating the write process to the ownership controller 21 in a case where the controller 21 having the write request received therein from the host 4 (hereinafter, referred to as "FE controller") does not have the ownership of the target LDEV 24. In the following, for facilitation of the description, though the "controller 21" is the subject, the write program 216 of the controller 21 operates.

Step 1101: The FE controller 21 transmits a process request to delegate the write process, to the ownership controller 21. Moreover, the FE controller 21 receives the write target data from the host 4 and transmits the write target data to the ownership controller 21. The FE controller 21 thereafter waits for a process completion notice from the ownership controller 21 (step 1107).

Step 1102: The ownership controller 21 receives the write process request and the write target data from the FE controller 21. Step 1103: The ownership controller 21 stores the write target data in the cache memory area of the main storage 210. Step 1104: The ownership controller 21 notifies the FE controller 21 that the writing of the write target data into the cache memory comes to an end.

Step 1105: The ownership controller 21 determines the page to be the destage destination of the data that is stored in the cache at step 1103. In a case where a page is assigned to the LDEV logical address of the write target, the ownership controller 21 determines this page as the destage destination. In a case where no page is assigned to the LDEV logical address of the write target, the ownership controller 21 newly assigns a page from the VDEV 23 to the address space that includes this logical address, and determines this page as the destage destination. At this time, the VDEV 23 that is the assignment source of the page does not need to be present on the node same as that of the ownership controller 21.

Step 1106: The ownership controller 21 destages the data stored in the cache at step 1103 to a page on the VDEV 23. In a case where the VDEV 23 that is the destage destination is present in another node, the ownership controller 21 transfers the target data to the controller 21 in the other node and issues a destage request. In a case where a page is newly assigned from the VDEV 23, the ownership controller 21 updates the page amount management table 213.

Step 1107: The FE controller 21 receives a process completion notice from the ownership controller 21. Step 1108: The FE controller 21 returns a response to the host 4. Step 1109: The FE controller 21 acquires the operation rate of the CPU 28 in the inside and updates the CTL management table 214. Moreover, the FE controller 21 updates the IOPS and the data transfer amount in the between-LDEV-and-FE port load table 212 in accordance with the write process for the pair of the target LDEV 24 of this write request and the host connection port 25 that has this write request received therein.

Figure 12A:
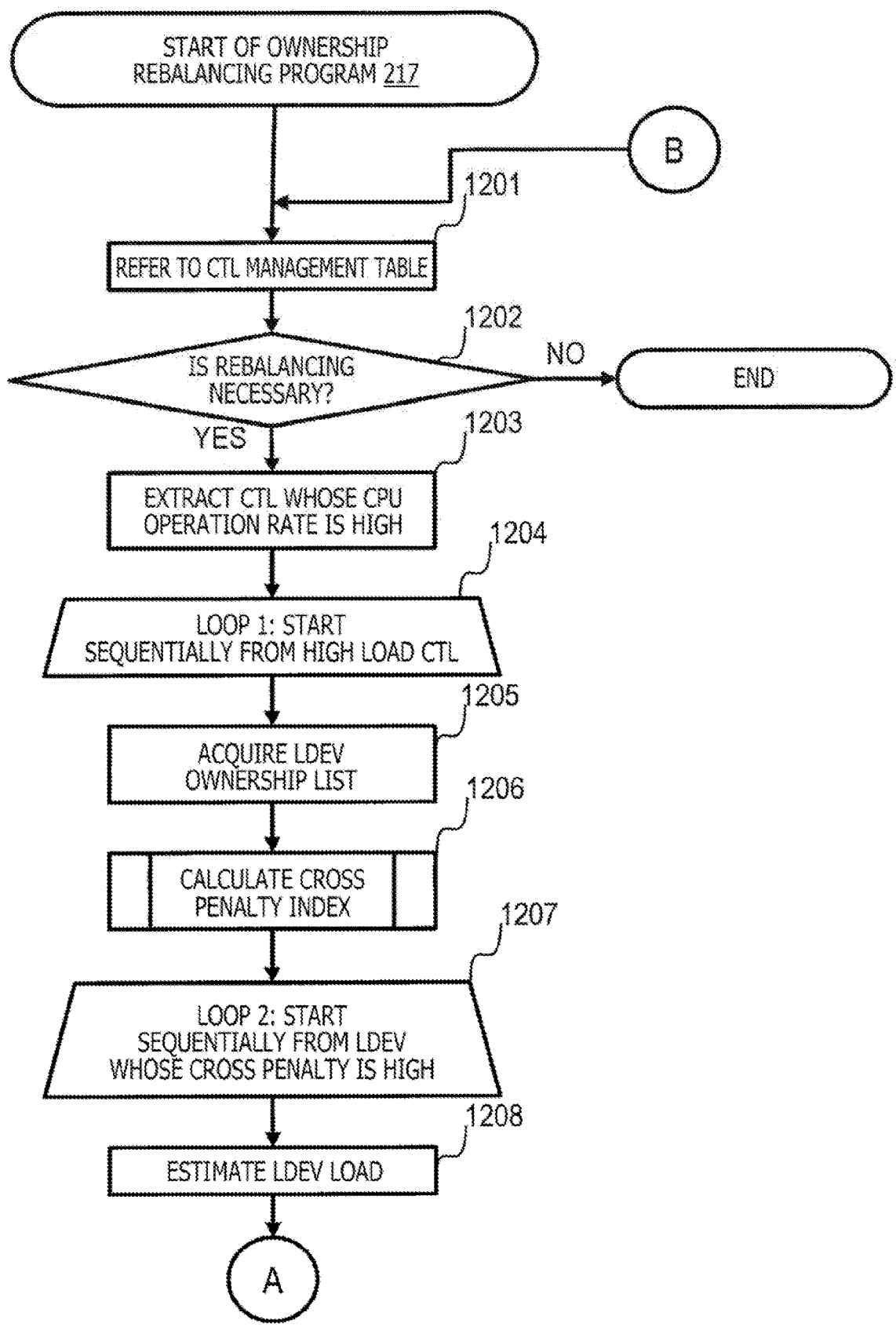
FIG. 12A is a diagram depicting an LDEV ownership rebalancing program in the first embodiment.
Figure 12B:
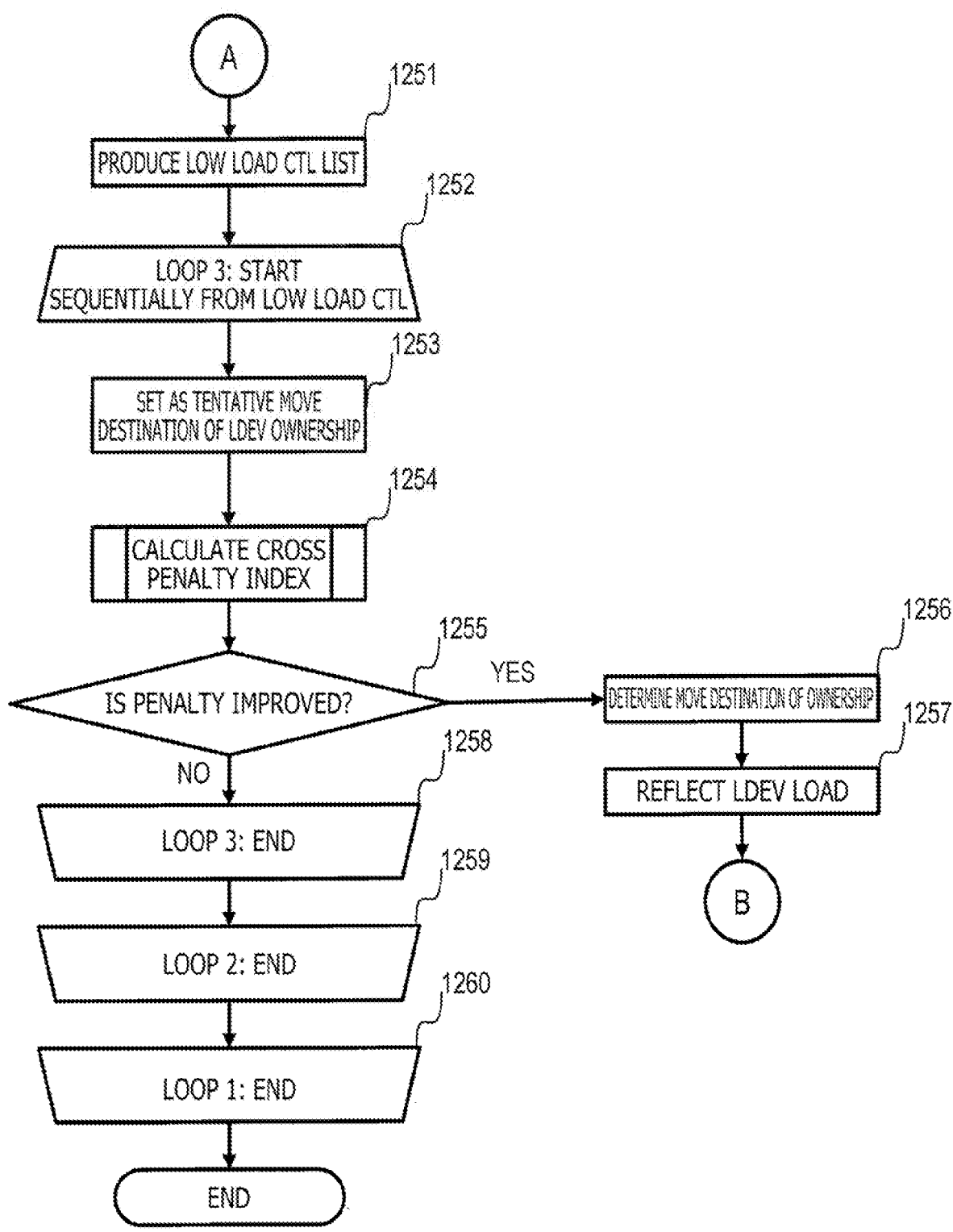
FIG. 12B is a diagram depicting the LDEV ownership rebalancing program in the first embodiment.

FIG. 12A and FIG. 12B are the process flow of the LDEV ownership rebalancing program 217. The ownership rebalancing program 217 executes evaluation for the move of the ownership and, in a case where the evaluation result is affirmative, moves the ownership. The ownership rebalancing program 217 determines permission or rejection for the move of the ownership of this LDEV from a move origin candidate controller to a move destination candidate controller, on the basis of the relation between a cross penalty index of the move origin candidate controller of the LDEV and the cross penalty index of the move destination candidate controller. In the following, the operations based on flowcharts in FIG. 12A and FIG. 12B will be described in detail.

FIG. 12A is first referred to. Step 1201: The ownership rebalancing program 217 refers to the CTL management table 214 and acquires the operation rate of the CPU 28 of each of the controllers 21. Step 1202: The ownership rebalancing program 217 determines whether or not rebalancing of the ownership is necessary, on the basis of the CPU operation rate of each of the controllers 21. For example, the fact that the difference between the maximal value and the minimal value of the CPU operation rate of the controller 21 exceeds a threshold value set in advance or that the dispersion of the CPU operation rate exceeds a threshold value set in advance, is usable as the condition for the determination.

In a case where the ownership rebalancing program 217 determines that the rebalancing is necessary (1202: YES), the ownership rebalancing program 217 advances to step 1203 and, in a case where the ownership rebalancing program 217 determines that the rebalancing is unnecessary (1202: NO), the ownership rebalancing program 217 comes to an end.

Step 1203: The ownership rebalancing program 217 produces a list that has the controllers 21 extracted therein whose CPU operation rates each exceed a predetermined threshold value, as the candidates for the controller 21 to be the move origin of the LDEV ownership. For example, the average value of the CPU operation rates of all the controllers 21 or a fixed value set in advance is usable as this threshold value. The ownership rebalancing program 217 stores the list of the extracted controllers 21 (hereinafter, described as "high operation rate controller list") into the main storage 210.

Step 1204: The ownership rebalancing program 217 selects the controllers in order of decreasing CPU operation rate from the high operation rate controller list as the move origin candidate controllers 21, and repeats the processes at and after step 1205. This enables effective load distribution.

Step 1205: The ownership rebalancing program 217 refers to the LDEV management table 211, produces a list of the LDEVs 24 for which the move origin candidate controller 21 has the ownership (hereinafter, described as "candidate LDEV list"), and stores the candidate LDEV list into the main storage 210. Step 1206: The ownership rebalancing program 217 calculates the cross penalty index for each of the LDEVs 24 in the candidate LDEV list. The details of the calculation of the cross penalty index will be described later.

Step 1207: For the LDEVs 24 in the candidate LDEV list, the ownership rebalancing program 217 selects the LDEVs in order of decreasing cross penalty index as the candidate LDEVs 24, and repeats the processes at and after step 1208. This enables execution of efficient move of the ownership.

Step 1208: The ownership rebalancing program 217 estimates the CPU operation rate necessary for the process of each of the candidate LDEVs 24. As an example of the estimation method for this value, a value acquired by multiplying the CPU operation rate of the move origin candidate controller, by the rate of the throughput of the candidate LDEV 24 (represented by, for example, the IOPS or the data transfer amount per unit time) that accounts for in the overall throughput of the move origin candidate controller can be acquired as the CPU operation rate estimated value.

FIG. 12B will next be referred to. Step 1251: The ownership rebalancing program 217 refers to the CTL management table 214, and produces a list that has the controllers 21 extracted therein whose CPU operation rates are each equal to or lower than a certain threshold value, on the basis of operation rate information of the CPU 28 of each of the controllers 21 of the storage system 1. For example, the average value of the CPU operation rates of all the controllers or a value that is set in advance is usable as this threshold value. The controller 21 retains the list of the extracted controllers 21 (hereinafter, referred to as "low operation rate controller list") in the main storage 210.

Step 1252: The ownership rebalancing program 217 selects the controllers in order of increasing CPU operation rate in the low operation rate controller list as the move destination candidate controllers 21, and repeats the processes at and after step 1253. This enables effective load distribution.

Step 1253: The ownership rebalancing program 217 sets a move destination candidate controller 21 as a tentative move destination of the ownership of the candidate LDEV 24. Step 1254: The ownership rebalancing program 217 calculates the cross penalty index for a case where the ownership of the candidate LDEV 24 is moved to the move destination candidate controller 21. The details of the calculation of the cross penalty index will be described later.

Step 1255: The ownership rebalancing program 217 compares the value of the cross penalty index of the move destination candidate controller 21 and the present value of the cross penalty index with each other. In a case where the ownership rebalancing program 217 determines that the value of the cross penalty index of the move destination candidate controller 21 is lower than the present value (1255: YES), the ownership rebalancing program 217 moves to step 1256. In a case where the ownership rebalancing program 217 determines that the value of the cross penalty index of the move destination candidate controller 21 is not lower than the present value (1255: NO), the ownership rebalancing program 217 moves to step 1258. Step 1256: The ownership rebalancing program 217 moves the ownership of the candidate LDEV 24 to the move destination candidate controller 21. In a case where the value of the cross penalty index is thereby improved, the ownership rebalancing program 217 determines that the ownership of the candidate LDEV 24 is moved to the move destination candidate controller 21.

As in the above example, in a case where the range of variation of the cross penalty index is in a permissible range set in advance, the ownership rebalancing program 217 determines to move the ownership of the candidate LDEV 24 to the move destination candidate controller 21. In an example different from the above example, in a case where the value of the cross penalty index is equal or improved, the ownership rebalancing program 217 may determine to move the ownership. Furthermore, in a case where the degree of degradation of the cross penalty index is lower than a predetermined degree, the ownership rebalancing program 217 may also determine to move the ownership.

More specifically, in a case where the value acquired by subtracting the present cross penalty index from the cross penalty index of the move destination candidate controller 21 is smaller than a predetermined value, the ownership rebalancing program 217 may move to step 1257. The predetermined value may be zero or a positive value. Step 1257: The ownership rebalancing program 217 estimates the CPU operation rate of each of the controllers 21 after the ownership of the candidate LDEV 24 is moved, and stores this value in the main storage 210. More specifically, the ownership rebalancing program 217 estimates the CPU operation rate using the following method.

The ownership rebalancing program 217 first acquires the CPU operation rate of each of the controllers 21 from the CTL management table 214. The ownership rebalancing program 217 thereafter subtracts the value of the CPU operation rate necessary for the process of the candidate LDEV 24 estimated at step 1208 from the CPU operation rate of the move origin candidate controller 21, and adds this estimated value to the CPU operation rate of the move destination candidate controller 21.

To maintain the new CPU operation rate information regarding each of the controllers 21 acquired in this manner, the ownership rebalancing program 217 secures a table having the same structure as that of the CTL management table 214 on the main storage 210 (hereinafter, referred to as "CPU operation rate update table"), and stores therein the result.

At each of the steps executed thereafter, in situations where the CTL management table 214 is referred to, not the CTL management table 214 but the CPU operation rate update table is referred to. When the move of the LDEV ownership is attempted for the second time or thereafter, the fluctuation of the CPU operation rate of each of the controllers 21 generated by the move of the LDEV ownership determined before the attempt is thereby taken into consideration.

Step 1258: The ownership rebalancing program 217 determines whether or not the move destination candidate controller 21 is the final element of the low operation rate controller list. In a case where the ownership rebalancing program 217 determines that the move destination candidate controller 21 is the final element, the ownership rebalancing program 217 moves to step 1259. In a case other than the above, the ownership rebalancing program 217 selects the controller 21 whose CPU operation rate is the next lowest in the low operation rate controller list as the move destination candidate controller 21, and moves to step 1253.

Step 1259: The ownership rebalancing program 217 determines whether or not the candidate LDEV 24 is the final element of the candidate LDEV list. In a case where the ownership rebalancing program 217 determines that the candidate LDEV 24 is the final element, the ownership rebalancing program 217 moves to step 1260. In a case other than the above, the ownership rebalancing program 217 selects the LDEV 24 whose cross penalty index is the next highest in the candidate LDEV list as the candidate LDEV 24, and moves to step 1208.

Step 1260: The ownership rebalancing program 217 determines whether or not the move origin candidate controller 21 is the final element of the high operation rate controller list. In a case where the ownership rebalancing program 217 determines that the move origin candidate controller 21 is the final element, the ownership rebalancing program 217 causes the process to come to an end. In a case other than the above, the ownership rebalancing program 217 selects the controller 21 whose CPU operation rate is the next highest in the high operation rate controller list as the move origin candidate controller, and moves to step 1205.

Figure 13:
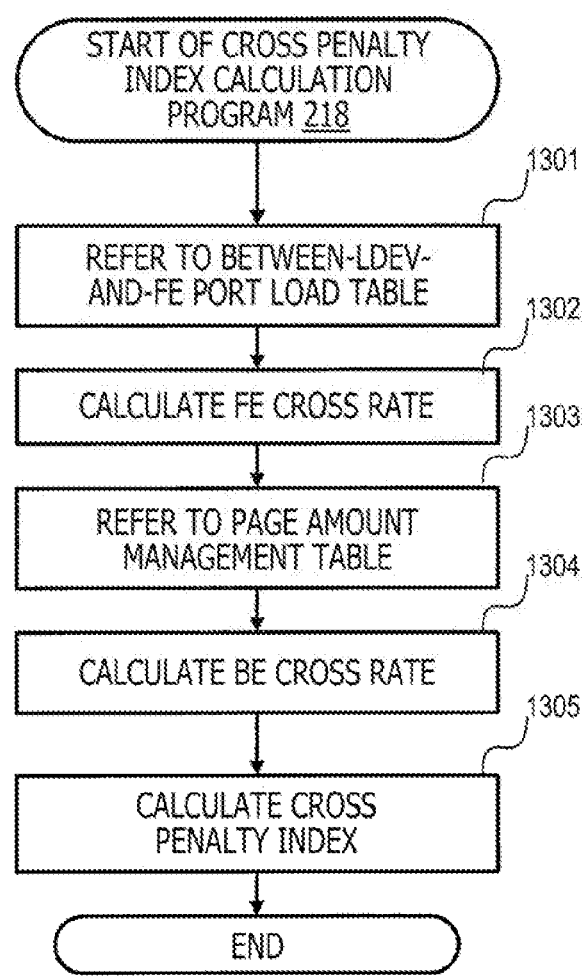
FIG. 13 is a diagram depicting a cross penalty index calculation program in the first embodiment.

FIG. 13 is a process flow of the cross penalty index calculation program 218. In this process, a combination of the LDEV 24 (hereinafter, referred to as "target LDEV") and the controller 21 (hereinafter, referred to as "target controller") is selected. In this process, for this combination, when the target controller 21 has the ownership of the target LDEV 24, generation ratios of the FE cross (delegation of the ownership) and the BE cross (data transfer between nodes) for the case where the I/O for the target LDEV 24 is received from the host 4 are estimated. Moreover, in this process, the magnitude of the influence on the performance by the FE cross and the BE cross is estimated.

The operations based on the flowchart in FIG. 13 are as follows. Step 1301: The cross penalty index calculation program 218 refers to the between-LDEV-and-FE port load table 212, and extracts rows in each of which the identifier allocated to the target LDEV 24 (an LDEV ID) matches with the value in a column 2121.

Step 1302: The cross penalty index calculation program 218 calculates the sum of the values in a column 2123 that stores therein the IOPSs (hereinafter, referred to as "IOPS total value") for the rows extracted at step 1301, and temporarily stores this sum in the main storage 210 in the controller 21. Similarly, the cross penalty index calculation program 218 calculates the sum of the values in a column 2124 that stores therein the data transfer amount per unit time (hereinafter, referred to as "data transfer amount total value") for the rows corresponding to the target LDEVs 24, and temporarily stores this sum in the main storage 210 in the controller 21.

Moreover, the cross penalty index calculation program 218 selects rows in each of which the value in the column 2122 that stores therein the identifier of the FE port matches with any of the identifiers of the host connection ports incorporated in the target controller 21, of the rows extracted at step 1301. The cross penalty index calculation program 218 calculates the sum of the values in the column 2123 that stores therein the IOPS (hereinafter, referred to as "FE straight IOPS total value") for each of the selected rows, and temporarily stores this sum in the main storage 210 in the controller 21. Moreover, the cross penalty index calculation program 218 calculates the sum of the values in the column 2124 that stores therein the data transfer amount per unit time (hereinafter, referred to as "FE straight data transfer amount total value") for each of the selected rows, and temporarily stores this sum in the main storage 210 in the controller 21.

The cross penalty index calculation program 218 calculates the FE cross ratio in accordance with the following equation. The FE cross ratio is an index of the overhead that is attributable to the fact that the controller having no ownership receives, from the host, an access request for the candidate logical storage device. An increase in the FE cross ratio indicates an increase in the processing in the system (the overhead) in a read process and a write process.

$$1-(\text{FE straight IOPS total value})/(\text{IOPS total value})$$

Otherwise, the following equation may be used.

$$1-(\text{FE straight data transfer amount total value})/(\text{data transfer amount total value})$$

In this manner, the cross penalty index calculation program 218 calculates the ratio of the throughput total value of the LDEV 24 for which the target controller 21 has no ownership (the FE cross throughput total value). The throughput is the IOPS or the data transfer amount. With the FE cross ratio, a more appropriate cross penalty index can be calculated. In addition, the cross penalty index calculation program 218 may use the FE cross throughput total value instead of the FE cross ratio.

Step 1303: The cross penalty index calculation program 218 refers to the page amount management table 213 and extracts rows in each of which the LDEV ID of the target LDEV 24 matches with the value in the column 2131. Step 1304: The cross penalty index calculation program 218 calculates the sum of the values in the column 2133 (hereinafter, referred to as "total page amount") for the rows extracted at step 1303, and temporarily stores this sum in the main storage 210 in the controller 21.

Moreover, the cross penalty index calculation program 218 calculates the sum of the values in the column 2133 for the rows in each of which the value in the column 2132 matches with the VDEV ID included in the target controller 21 (hereinafter, referred to as "straight VDEV total page amount"), of the rows extracted at step 1303, and temporarily stores this sum in the main storage 210 in the controller 21.

Thereafter, the cross penalty index calculation program 218 calculates the BE cross ratio in accordance with the following equation. The BE cross ratio is an index of the overhead that is attributable to the fact that the controller accesses a physical storage area that is assigned to the candidate logical storage device through another controller. An increase in the BE cross ratio indicates an increase in the processing in the system (the overhead) in a read process or a write process.

$$1-(\text{straight VDEV total page amount})/(\text{total page amount})$$

With the BE cross ratio, a more appropriate cross penalty index can be calculated. Moreover, the BE cross ratio can more efficiently be calculated by using the page amount. In addition, a real storage data amount may also be used instead of the page amount. A BE cross data amount or a BE cross page amount may also be used instead of the BE cross ratio.

Step 1305: The cross penalty index calculation program 218 calculates the cross penalty index on the basis of the FE cross ratio and the BE cross ratio that are temporarily stored in the main storage. This value can be acquired as, for example, the sum of the values each acquired by multiplying the FE cross ratio and the BE cross ratio each by a coefficient. This enables calculation of a more appropriate cross penalty index. At this time, each of the coefficients may be a value set in advance. Only one of the FE cross ratio or the BE cross ratio may also be used.

In the above configuration example, one storage network is configured by coupling a plurality of nodes using a between-controller network. In another example, a plurality of storage apparatuses may be connected to each other using another network connection technique such as a local area network or the Internet.

Second Embodiment

A response time period after the ownership of the candidate LDEV 24 is moved to the move destination candidate controller 21 is taken into consideration, in moving the ownership according to this embodiment. The conditions for the move of the ownership to be permitted include that the response time period is in a permissible range in addition to that the cross penalty index after the move of the ownership is in a permissible range. Degradation of the response time period due to the move of the ownership can thereby be alleviated.

In this embodiment, an estimated response time period is calculated for a case where the ownership is moved as to each of the LDEVs 24 for each of which the move destination candidate controller 21 has the ownership thereof. In this embodiment, the ownership of the candidate LDEV 24 is moved in a case where it is estimated, on the basis of this value, that an increase in the response time period or the response time period after the increase of each of the LDEVs 24 of the move destination candidate controllers 21 stays in a permissible range that is set in advance. In addition, the response time period may also be evaluated for the LDEV 24 for which the move destination candidate has no ownership thereof.

Modifications from the first embodiment will mainly be described below. The main storage 210 in FIG. 3 stores therein a CPU operation rate-response time period table 219 and an ownership rebalancing program 220 based on the estimated response time period.

Figure 14:
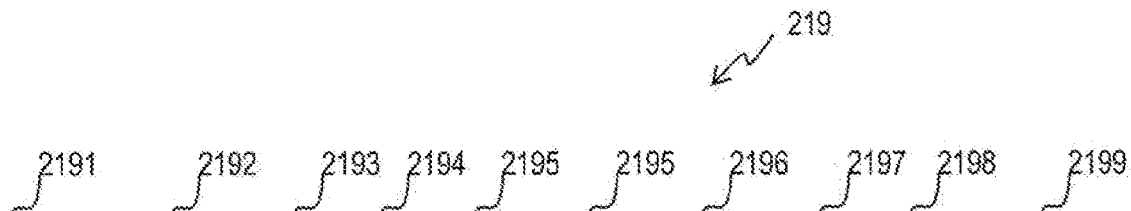
FIG. 14 is a diagram depicting a central processing unit (CPU) operation rate-response time period table in a second embodiment.

FIG. 14 is a diagram for explaining the CPU operation rate-response time period table 219 in this embodiment. The CPU operation rate-response time period table 219 is a table that stores therein information for estimating the response time period for an I/O request from the host 4. More specifically, the CPU operation rate-response time period table 219 stores therein the response time periods for the I/O request from the host 4 for each of the CPU operation rates of the ownership controller 21, for each of combinations of the access pattern from the host 4, the type of the I/O, presence or absence of the FE cross, and presence or absence of the BE cross.

Each of the rows in the CPU operation rate-response time period table 219 corresponds to the I/O conditions from the host 4 (including the access pattern, the type of the I/O, presence or absence of the FE cross, and presence or absence of the BE cross). Each of the rows stores therein the response time period for each of the CPU operation rates of the ownership controller 21 under the I/O conditions.

The columns of the CPU operation rate-response time period table 219 will be described below. The column 2191 stores therein the access pattern of the I/O. The access pattern is either a random access (described as "RND" in FIG. 14) or a sequential access (described as "SEQ" in FIG. 14).

The column 2192 stores therein the type of the I/O. The type of the I/O is either "read" or "write." The column 2193 stores therein presence or absence of the FE cross. "CR" (Cross) in FIG. 14 corresponds to the "FE cross is present" and "ST" (Straight) therein corresponds to the "FE cross is absent." The column 2194 stores therein presence or absence of the BE cross. "CR" in FIG. 14 corresponds to the "BE cross is present" and "ST" therein corresponds to the "BE cross is absent."

The columns 2195 to 2199 present the response time periods for the CPU operation rates of the ownership controller 21 under the corresponding I/O condition. The configuration example in FIG. 14 stores therein the response time periods at, as one example, six CPU operation rate values that are the operation rates of 0%, 20%, 40%, 60%, 80%, and 100%.

In addition, in FIG. 14, the CPU operation rate values corresponding to the columns 2195 to 2199 are one example, and other CPU operation rate values may be employed. Similarly, the number of these CPU operation rate values is one example and the number of the CPU operation rate values may be increased or decreased. Moreover, the values of the response time period in the CPU operation rate-response time period table 219 may each be a value that is set in advance.

Figure 15:
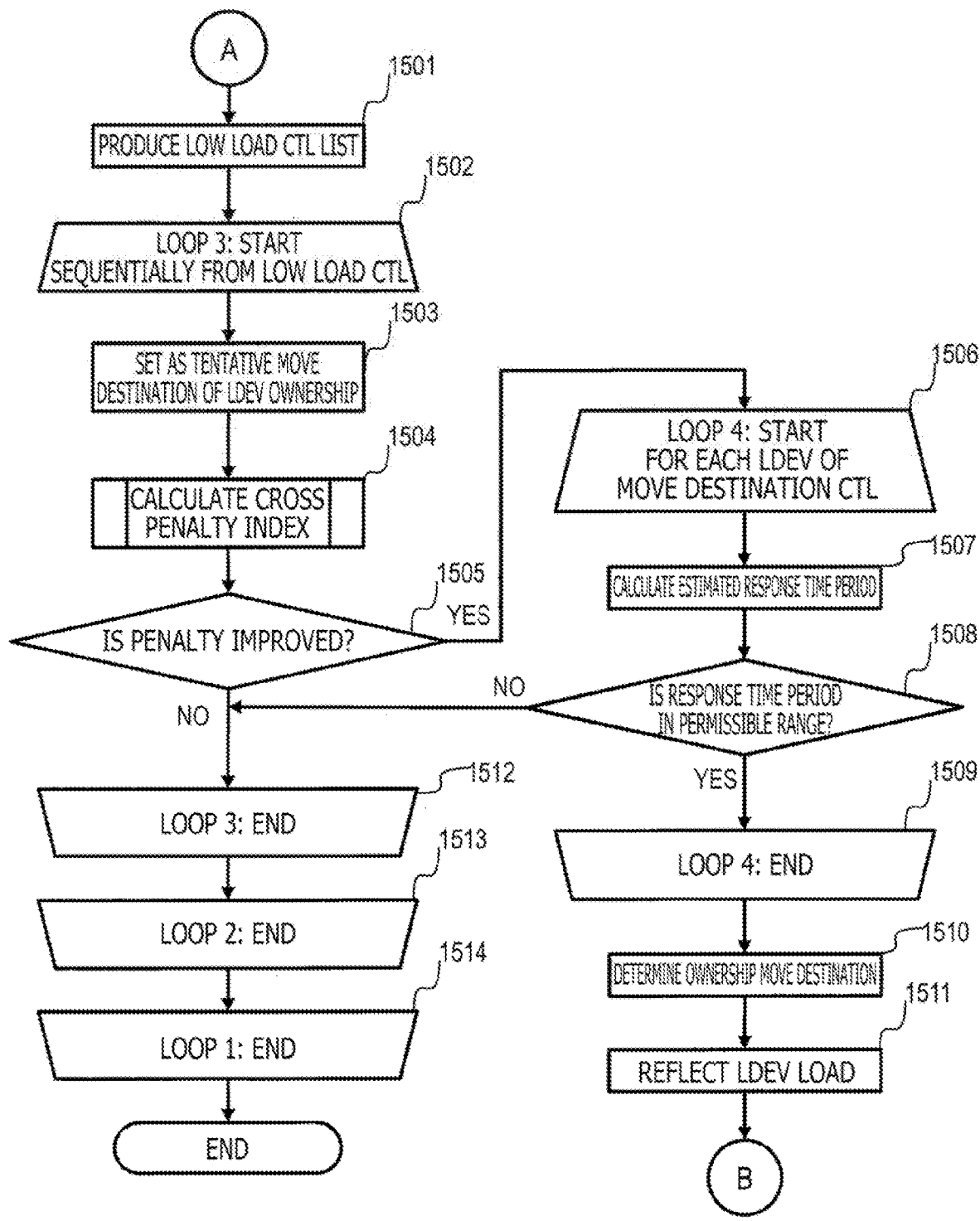
FIG. 15 is a diagram depicting an ownership rebalancing program based on estimated response time periods in the second embodiment.

FIG. 15 is a diagram for explaining a process flow of the ownership rebalancing program 220 based on the estimated response time period in this embodiment, on the basis of the difference from the ownership rebalancing program 217 in the first embodiment. In addition, the processes at and before step 1501 are similar to the steps in the process flow of the ownership rebalancing program 217 depicted in FIG. 12A and will therefore not be described again. In other words, the ownership rebalancing program 220 based on the estimated response time period moves from step 1208 to step 1501.

Operations based on the flowchart in FIG. 15 are as follows. In addition, the flowcharts in FIG. 12B and FIG. 15 each include steps at which similar processes are executed. The steps at which the similar processes are executed will be clearly indicated to that effect in the following description and will not be described again. Processes at steps 1501 to 1505 are the same as those at steps 1251 to 1255.

Step 1506: The ownership rebalancing program 220 calculates estimated response time periods acquired before and after the move of the ownership for each of the LDEVs 24 for which the move destination candidate controller 21 has the ownership thereof in loop processes executed thereafter, and thereafter determines whether or not the variation therebetween is in a permissible range that is set in advance. The ownership rebalancing program 220 therefore sequentially selects the LDEVs 24 for which the move destination candidate controller 21 has the ownership thereof, and repeats the processes at and after step 1507. In the description below, the selected LDEVs 24 will each be referred to as "check target LDEV 24."

Step 1507: The ownership rebalancing program 220 acquires an estimated response time period of the check target LDEV 24 under each of the I/O conditions, on the basis of the CPU operation rate-response time period table 219. In this case, the ownership rebalancing program 220 acquires each of the estimated response time periods acquired before and after the move of the ownership. The CPU operation rate acquired before the move of the ownership can be acquired from the CTL management table 214. The value acquired from the CTL management table 214 and the CPU operation rate value necessary for the process of the candidate LDEV 24 acquired at step 1208 are used in the calculation of the CPU operation rate acquired after the move of the ownership.

Regarding the above, in a case where a response time period that is in an intermediate portion between the CPU operation rate values recorded in the CPU operation rate-response time period table 219 is necessary, the value thereof can be acquired, for example, by linear interpolation from the response time periods at the CPU operation rate values therebelow and thereabove. For example, the estimated response time period at the CPU operation rate of 50% can be acquired by linear interpolation from the response time periods at the CPU operation rates of 40% and 60% recorded in the CPU operation rate-response time period table 219.

Step 1508: The ownership rebalancing program 220 determines whether or not the variation of the estimated response time period between before and after the move of the ownership under each of the I/O conditions, that is calculated in step 1507 is in a permissible range that is set in advance. This determination may be based on, for example, whether or not the increase rate or the increase amount of the estimated response time period is in a permissible threshold value that is designated in advance. In another example, the ownership rebalancing program 220 determines whether or not the estimated response time periods acquired before and after the move of the ownership are each in a permissible range that is set in advance. An upper limit of the estimated response time period is set, and this determination may be based on whether or not the estimated response time period acquired after the move of the ownership is below or equal to the upper limit.

When the determination result is "YES" (1508: YES), the ownership rebalancing program 220 moves to step 1509. When the determination result is "NO" (1508: NO), the ownership rebalancing program 220 moves to step 1512.

Step 1509: In a case where the check target LDEV 24 is the final element of the LDEVs 24 for which the move destination candidate controller 21 has the ownerships thereof, the ownership rebalancing program 220 moves to step 1510. In a case other than the above, the ownership rebalancing program 220 moves to step 1506. Step 1510: The ownership rebalancing program 220 determines that the ownership of the candidate LDEV 24 is to be moved to the move destination candidate controller 21. Processes at steps 1511 to 1514 are the same as those at steps 1257 to 1260.

In the above example, in a loop process from step 1506 to step 1509, calculation of and determination for the estimated response time period are executed for each of all the LDEVs 24 for which the move destination candidate controller 21 has the ownerships thereof. In another example, the target may be limited to a specific LDEV 24 (for example, the LDEV 24 that is designated by a user as the one whose response time period is especially important) in accordance with the use for utilizing each of the LDEVs.

Similarly, in the above example, the calculation of and the determination for the estimated response time period are executed for each of all the I/O conditions to which the check target LDEV 24 corresponds. In another example, the target may be limited to only a specific I/O condition (for example, "read") in accordance with the use for utilizing each of the LDEVs. As in these examples, permission or rejection of the move of the ownership can more appropriately be determined by executing the evaluation for the response time period under the different I/O conditions. In addition, a different determination criterion may be set for a different access pattern or a different type of I/O.

In this embodiment, the ownership is moved only in a case where it is determined that the estimated response time period acquired after the move of the ownership satisfies the predetermined requirements. As a result, execution of the load distribution of the storage system is enabled while the response time period requirements to the LDEV are satisfied.

In addition, the present invention is not limited to the embodiments described above, and includes various modification examples. For example, the embodiments described above have been described in detail to understandably explain the present invention, and are not necessarily limited to those including all the described configurations. Moreover, a portion of a configuration of a certain embodiment is replaceable with a configuration of another embodiment and, moreover, a configuration of an embodiment can also be added to a configuration of another embodiment. Moreover, for a portion of a configuration of each of the embodiments, addition of, deletion of, and replacement with another configuration can each be executed.

Moreover, a portion or all of the configurations, the functions, the processing parts, and the like described above may be realized by hardware by, for example, designing those with an integrated circuit. Moreover, each of the configurations, the functions, and the like described above may each be realized by software by the fact that a processor interprets and executes a program that realizes the functions thereof. Information regarding the program, tables, files, and the like that realize each of the functions can be placed in a memory, in a recording apparatus such as a hard disk or a solid state drive (SSD), or in a recording medium such as an integrated circuit (IC) card or a secure digital (SD) card.

Moreover, as to the control lines and the information lines, those that are considered to be necessary for the description are presented, and all the control lines and all the information lines for a product are not necessarily presented. It may be considered that most of the configurations are connected to each other in practice.

What is claimed is:

1. A storage system connected to hosts, the storage system comprising:
   a plurality of controllers;
   a plurality of physical storage devices; and
   a plurality of logical storage devices to which storage areas are assigned from the plurality of physical storage devices, wherein
   the plurality of controllers are communicably connected to each other, each of the plurality of controllers have a different physical storage device of the plurality of storage devices connected thereto with respect to the other controllers of the plurality of controllers and a different host connected thereto with respect to the other controllers of the plurality of controllers, and are each able to access the physical storage devices and the hosts that are not connected thereto through another controller,
   any one of the controllers has an ownership to process access requests to the logical storage devices, respectively,
   at least one controller of the plurality of controllers determines whether the ownership of a first logical storage device should be moved from a first controller to a second controller among the plurality of controllers on a basis of an index of accesses to the physical storage device that has the storage area to be assigned to the first logical storage device and an index of connection to the host that accesses the first logical storage device,
   the index of connection to the host is an index based on a rate of host accesses to the first controller having the ownership that are executed through another controller, and
   the index of accesses to the physical storage device is based on a rate of the physical storage areas assigned to the logical storage devices accessed by the first controller through another controller.

2. The storage system according to claim 1, wherein a rate of the host accesses to the controller having the ownership that are executed through another controller is a rate of a data amount or IOPSs.

3. The storage system according to claim 1, wherein conditions for determining the move include that the indexes are improved.

4. The storage system according to claim 1, wherein the storage system further determines that the ownership is caused to be moved among the plurality of controllers, on a basis of an index of a load of the controller.

5. The storage system according to claim 4, wherein conditions for the determination of the move include that an estimated response time period based on the indexes is in a predetermined range or is improved.

6. The storage system according to claim 4, wherein the at least one controller selects a move origin candidate controller and a move destination candidate controller for the logical storage device, on a basis of loads of the plurality of controllers, and determines whether or not the move is necessary.

7. The storage system according to claim 5, wherein the at least one controller evaluates variation of the estimated response time period for each of combinations of different access patterns and I/O types.

8. A method for a storage system connected to hosts to move an ownership of a logical storage device, wherein the storage system includes:
   a plurality of controllers,
   a plurality of physical storage devices, and
   a plurality of logical storage devices to which storage areas are assigned from the plurality of physical storage devices,
   the plurality of controllers are communicably connected to each other, each of the plurality of controllers have a different physical storage device of the plurality of storage devices connected thereto with respect to the other controllers of the plurality of controllers and a different host connected thereto with respect to the other controllers of the plurality of controllers and each are able to access the physical storage devices and the hosts that are not connected thereto, through another controller,
   any one of the controllers has the ownership to process access requests to the logical storage devices, respectively,
   the method comprising:
   determining, by at least one controller of the plurality of controllers, that an ownership of a first logical storage device should to be moved from a first controller to a second controller among the plurality of controllers on a basis of an index of accesses to the physical storage device that has the storage area to be assigned to the first logical storage device and an index of connection to the host that accesses the first logical storage device, wherein
   the index of connection to the host is an index based on a rate of host accesses to the first controller having the ownership that are executed through another controller, and
   the index of accesses to the physical storage device is based on a rate of the physical storage areas assigned to the logical storage devices accessed by the first controller through another controller.

* * * * *